Patented June 24, 1930

1,766,462

UNITED STATES PATENT OFFICE

WALTER O. SNELLING, OF ALLENTOWN, PENNSYLVANIA

CURRENT-RECTIFYING DEVICE

No Drawing.     Application filed February 14, 1927. Serial No. 168,245.

My invention relates to improvements in current rectifying devices and more particularly relates to improved methods for the preparation of contact rectifying elements of uniform and undistorted shape by the reaction between a metal and the vapor of an element of the sulfur group. One of the objects of my invention is to provide means for the commercial manufacture of current rectifying elements of copper sulfide of the exact shape of original blanks of metallic copper and entirely free from distortion.

When a metal such as copper is heated in the presence of the vapor of an element of the sulfur group, such as sulfur vapor for example, a highly exothermic reaction occurs, with the formation of a compound of the metal and the vaporous reagent, and the resulting reaction product forms a highly efficient contact rectifying agent for the obtaining of unidirectional current from alternating current, as described and claimed in my patent U. S. 1,565,595, and in my pending application S. N. 621,112.

My present invention relates to improvements in the preparation of contact rectifying agents of the described type, and has as its principal object the providing of means by which contact rectifying elements of any desired shape and size may be obtained from metal blanks without distortion or irregularity of shape resulting from the vigor with which the reaction proceeds.

The reaction between metals such as lead and copper for example, and elements of the sulfur group such as sulfur and selenium for example, is an exceptionally vigorous one, with the evolution of a very large amount of heat. The reaction, like many other reactions of highly exothermic nature, is accelerated in rate by increase in temperature, and accordingly when a metal such as lead or copper is exposed to the vapor of an element of the sulfur group such as sulfur vapor, selenium vapor or tellurium vapor, the reaction tends to "speed up" very rapidly, as a result of the heat produced by the reaction and the accelerating effect of the increasing temperature resulting from the heat so evolved being retained by the reacting materials. When small metal blanks are heated in the vapor of an element of the sulfur group to form contact rectifying elements in accordance with my previously described process, the small mass of each of the individual metal objects and the radiation made possible by the relatively large surface area of the objects as compared with their weight tends to limit distortion of shape from the intense heat produced by the reaction, but in the production of larger contact rectifying elements such as called for by existing commercial requirements the heat produced in the formation of even an individual contact rectifying element of large size tends to be evolved so rapidly that radiation is insufficient to permit its removal without more or less distortion of the contact rectifying element occurring, and the larger the size of the contact rectifying element, the greater is the tendency toward distortion of shape, with complete melting of the contact rectifying element occurring as the limiting factor when quite large disks of metal are treated.

I have discovered that by heating a metal object of desired shape to a temperature in excess of the temperature necessary for reaction, in a closed space containing a smaller amount of the vapor of an element of the sulfur group than will normally fill such space under the conditions of temperature and pressure therein existing, I can control the rate of reaction between the metal and the element of the sulfur group so as to completely avoid distortion, while obtaining as my final product the reaction compound of the two reagents in a form having nearly twice the volume of the original metal object, and being a wholly undistorted pseudomorph of same except for the increase in volume as noted.

As an example of my invention I may take disks of copper three centimeters in diameter and two millimeters in thickness, and place these in a reaction vessel such as a quartz tube. The tube and its contents are then heated to a dull red heat, and there is then passed through the tube a regulated stream of a vaporous reagent consisting of 20% by volume of sulfur vapor and 80% by volume of nitrogen, the rate of passage of the vaporous reagent being controlled by the appearance of the metal blanks under treatment and being limited to such flow as does not cause the metal blanks or their reaction product to become noticeably hotter than the heated tube within which they are contained, as indicated by their color.

Under the described conditions the heat produced by the reaction between the copper disks and the sulfur vapor is shared between the solid reaction product and the gaseous atmosphere surrounding it, and acceleration of the reaction to a rate that will lead to an excessive temperature that will produce distortion is avoided by such exchange of heat, instead of all of the heat being available to raise the temperature of the reaction product.

It will be noted that the significant feature of my present invention is the heating of a metal to a temperature in excess of that necessary to initiate reaction with the vapor of an element of the sulfur group in a vessel containing at any instant a smaller quantity of the vapor of an element of the sulfur group than would normally fill such vessel at the temperature and pressure therein existing.

Although in the example just given I have described the employment of dilution with an inert gas as the means used to reduce the quantity of the active vaporous reagent to an amount less than would represent the quantity that would fill the vessel if present in pure condition at the temperature and pressure existing, it must be remembered that it is possible to exert corresponding control of the reaction with resulting reduction in its vigor without the use of an inert diluent, by performing the reaction in the presence of the concentrated vapor of an element of the sulfur group but under subatmospheric or reduced pressure. As an example of this phase of my invention I may place disks of copper of any desired size and shape within a quartz tube which is then evacuated and while under subatmospheric pressure is heated to a red heat and while thus heated is brought into communication with a source of sulfur vapor at a temperature of about 500° C. The sulfur vapor reacts vigorously with the copper upon coming in contact with same, with the evolution of a large amount of heat, and by limiting the rate at which the sulfur vapor is admitted to the reaction chamber the vigor of the reaction may be moderated to any desired extent. As practical means of control I find it desirable to bring about the described reaction in tubes of transparent quartz, the amount of vaporous reagent admitted being controlled by the temperature of the reaction product as shown by its color. At a dull red heat no distortion occurs, while at a bright red heat some distortion occurs and at a very bright red heat fusion may occur. I have found it a relatively simple matter to control the vigor of the reaction by the means described with the production of reaction products of wholly undistorted shape, this representing a very important advance in the manufacture of contact rectifying elements.

Instead of employing transparent vessels and determining the temperature of the reaction product by its color as visible through the walls of the tube, I may of course employ a pyrometer within the tube, admitting my vaporous reagent of the pure vapor of an element of the sulfur group, or my reagent comprising such vapor in the presence of an inert diluent, at such rate as will permit the desired reaction to go on without excessive overheating. In general I prefer to employ a temperature of 500° C. or slightly higher, while avoiding temperatures in excess of 700° C. when measured by a pyrometer within the reaction vessel in the manner described. The temperature employed will of course depend upon the particular metal and upon the particular vapor of an element of the sulfur group which is used, and the temperatures as stated are those employed in the preferred embodiment of my invention, employing copper as the metal used and sulfur as the vapor of an element of the sulfur group used.

Although I prefer to employ lead or copper, or their admixtures or alloys, in the practice of my present invention, my present process is by no means limited to their use, and I have successfully employed other metals and particularly silver and alloys of silver and lead, as equivalents. Similarly although I prefer to employ sulfur vapor as my vaporous element of the sulfur group, the vapors of selenium or tellurium, alone or in admixture with each other or with sulfur vapor, may be employed in an exactly similar way to that described. Using sulfur vapor as my vaporous reagent, I prefer to use a concentration of the reagent within my treating vessel, depending upon the temperature maintained within the reaction vessel, of from one to two grams of sulfur vapor per liter of volume of the reaction vessel, when a maintained temperature of 500° C. is employed. When higher temperatures are used, thus bringing the initial temperature closer to the temperature at which distortion will begin, I find it desirable to employ still lower concentrations of sulfur vapor, and when using a maintained temperature of 800° C. within my treating vessel, I prefer to employ a concentration of the sulfur vapor as low as one tenth of one gram per liter of volume of the treating vessel, and in no case do I use in excess of five tenths of one gram of sulfur vapor per liter of volume of the treating vessel. The concentrations named may be used, whether the reduced amount of the vaporous reagent is controlled by reduction in pressure within the treating vessel to subatmospheric pressure, or whether the reduced amount of the vaporous reagent is controlled by admixture of the active vaporous reagent with an inert diluent such as nitrogen or other chemically indifferent gas.

The importance of the present invention rests wholly upon the ability to produce by its use contact rectifying elements of uniform size and shape such as may be used in the assembly of contact rectifying devices with a minimum of "dressing" or treating to bring to final form. In modern production methods entire interchangeability of parts is regarded as essential, and my present invention permits of the production from metal blanks of contact rectifying elements that are completely interchangeable and that are wholly uniform in size and shape and free from distortion resulting from the intense temperature produced in the normal reaction between an element of the sulfur group and a metal, and which distortion has hitherto seriously limited the use of contact rectifying elements in the manufacture of battery chargers and like devices for the production of unidirectional current from alternating current sources.

It will be evident that many changes may be made without departing from the essential principles of my invention as herein described, and accordingly no limitations should be placed upon my invention except as indicated in the appended claims.

I claim:

1. In the preparation of contact rectifying elements the process which comprises heating a metal in an atmosphere comprising sulfur vapor and an inert fluid diluent.

2. In the preparation of contact rectifying elements the process which comprises heating a metal to a red heat in an atmosphere comprising sulfur vapor and an inert fluid diluent.

3. In the preparation of contact rectifying elements the process which comprises heating metallic copper in an atmosphere comprising sulfur vapor and an inert fluid diluent.

4. In the preparation of contact rectifying elements the process which comprises heating metallic copper to a red heat in an atmosphere comprising sulfur vapor and an inert fluid diluent.

5. In the preparation of contact rectifying elements the process which comprises heating a metal in a closed space in the presence of an atmosphere comprising the vapor of an element of the sulfur group and an inert fluid diluent.

In testimony whereof, I have hereunto subscribed my name this 12th day of February 1927.

WALTER O. SNELLING.